(12) United States Patent
Pryor et al.

(10) Patent No.: US 6,641,237 B1
(45) Date of Patent: Nov. 4, 2003

(54) MODULAR CABINETS WITH PORTABLE STAND MOUNT

(75) Inventors: Jeffery W. Pryor, Carlsbad, CA (US); Paul E. Pryor, Failbrook, CA (US); Kevin Donahue, Oceanside, CA (US)

(73) Assignee: Pryor Products, Oceanside, CA (US)

( * ) Notice: Subject to any disclaimer, the term of this patent is extended or adjusted under 35 U.S.C. 154(b) by 0 days.

(21) Appl. No.: 09/538,383

(22) Filed: Mar. 29, 2000

Related U.S. Application Data

(60) Provisional application No. 60/126,838, filed on Mar. 30, 1999, and provisional application No. 60/134,436, filed on May 17, 1999.

(51) Int. Cl.[7] .............................................. A47B 67/00
(52) U.S. Cl. .................................. 312/245; 312/257.1
(58) Field of Search ................................ 312/111, 198, 312/221, 257.1, 245, 246, 242; 108/151; 248/407, 408, 409

(56) References Cited

U.S. PATENT DOCUMENTS 3,030,735 A    4/1962  Bodkins
4,119,044 A   10/1978  Hines
4,478,466 A * 10/1984  Clark et al. .................. 312/221
4,826,115 A    5/1989  Novitski
4,914,873 A *  4/1990  Newhouse .................... 312/198
5,106,173 A *  4/1992  Kelley et al. ................ 312/111

FOREIGN PATENT DOCUMENTS

EP    0 784 951       1/1997
IT      636074    *  3/1962  .................. 312/245

* cited by examiner

Primary Examiner—Lanna Mai
Assistant Examiner—Jerry A Anderson
(74) Attorney, Agent, or Firm—Brown Martin Haller & McClain

(57) ABSTRACT

Cabinet modules are readily attached and removed from selected attachment parts on a vertical support to provide customized portable storage and instrument mounting. Drawers may be accommodated within a module. A lock on a single drawer can secure all other drawers and modules on one side of the vertical support. An uninterruptable power supply can e incorporated into an enclosed, ventilated module and located at an attachment point low on the vertical support to maintain a low center of gravity while supplying portable power to electronic instruments carried on the vertical support.

1 Claim, 5 Drawing Sheets

MODULAR CABINETS WITH PORTABLE STAND MOUNT

CROSS-REFERENCES TO RELATED APPLICATIONS

This application claims the benefit of priority of United States provisional applications Serial No. 60/126,838, filed Mar. 30, 1999, and Serial No. 60/134,436 filed May 17, 1999, now abandoned which are incorporated herein by reference in their entirety.

BACKGROUND OF THE INVENTION

There are many work environments that require portable access to tools, instruments, equipment and supplies as well as electronic systems. A particularly demanding environment in which instruments and supplies are regularly moved from place to place throughout the workday, is the hospital environment. Nurses and other health-care workers must move medical supplies from room to room as they treat different patients. In some cases the patients themselves require storage for personal belongings, and for patient-specific supplies, such as specialized wound dressings. In addition, patients may require portable access to medical instruments such as IV pumps, heart monitors and the like.

According to conventional practice, each distinct storage or instrumentation need is dealt with separately, resulting in the multiple storage containers or cabinets that must be independently pushed or carried from room to room. In the example of a nursing professional, the nurse must load supplies into a toolkit or similar carrier. Since the total of supplies for a shift may exceed a weight that can easily be carried, the nurse must return to a central location to obtain additional supplies throughout the shift. The additional trips are wasteful of worker time. The problem of excessive supplies is compounded by the requirement for safe storage of used needles, catheters, and the like, generally referred to as sharps. OSHA regulations and good practice require that these sharps be stored in a locked container. Existing solutions have failed to recognize these needs with a comprehensive solution.

Prior art portable cabinets are not easily adaptable to differing storage requirements. For example, the requirements for storage by a shift nurse who serves a relatively small number of patients all on a single floor in the hospital are markedly different from those of the nurse whose primary task is to take blood samples from the patients throughout the hospital. Still other considerations apply to patient-specific storage. A patient may require a wheeled stand which is normally at the bedside in the hospital room. The stand may incorporate an IV pole for elevating bags of intravenous fluids above an IV pump carried on the stand. When it is necessary to transport that patient, for example for x-ray imaging, it is necessary to wheel the patient bed or gurney and stand together to another location in the hospital. Conventional IV stands have no provision for powering the medical instrumentation required by the patient as the stand and bed are wheeled from the patient room to the hospital x-ray department. Although most medical instrumentation incorporates backup batteries, it is very common for those batteries to become discharged while the patient is in transport or while awaiting a medical procedure such as x-ray imaging. An ideal stand for these circumstances would incorporate castoring wheels, provision for bed mounting and an uninterruptable power supply (UPS).

Against the divergent requirements of various needs for storage, locked storage, wheeled transport and future adaptability, the hospital administrator must weigh the cost of custom-designed cabinetry and the associated cost of having to carry a large inventory of different portable cabinets and storage of the cabinetry and stands of the off-duty health-care worker. Storage room space is in short supply in hospitals, which typically already contain a number of wheeled stands such as IV stands.

The examples of the hospital environment are also instructive as to the difficulties of portable cabinets used in other work environments, such as manufacturing, inspection and auto repair.

It is therefore desirable to have a portable stand and cabinet with modular components that may be adapted to multiple storage and transport requirements and where one or more of the drawers or other storage openings in the cabinet may be locked to limit access to the contents to only authorized persons. Such a modular cabinet is particularly desirable where it can be adapted to existing wheeled stands, and where a locking mechanism is provided that not only prevents access to specific drawers, but also prevents disassembly of the modular cabinetry from the stand except for those persons who have the key or combination to a cabinet lock.

SUMMARY OF THE INVENTION

In an exemplary embodiment of the invention the deficiencies of prior art transportable cabinets are resolved by providing a portable stand which is preferably wheeled and which incorporates a vertical support adapted to carry multiple modular cabinets, together with a push handle. The portable stand may also provide an elevated mounting for electronic instruments and other electrically powered apparatus, such as portable computers. When used in the exemplary medical environment, the electronic instruments may include IV pumps, heart monitors, respiration therapy machines and virtually any other medical instrument that must be transported from room to room and from patient to patient. The stand may incorporate a vertical pole extending outwardly from the push handle to support medical supplies including bags of intravenous fluids.

A stand mounting interface is provided which may be utilized to mount from the vertical supports of existing stands. For example, for stands with a vertical support that has a circular cross-section, each interface will have a part circular surface for engagement with the vertical support. Preferably the interface is provided in two parts which may be clamped or otherwise fastened together to firmly grip the central pole of the stand and provide a firm mount for cabinets and other supported modular structures. Mounting channels are secured to the interface plate and are spaced from the interface plate a sufficient distance to allow an internal slider to reciprocate vertically within the mounting channel and to interfit with a face plate.

The mounting channel performs multiple functions which are accommodated by spaced openings along the vertical extent of the mounting channel. These openings allow for a cam operator to penetrate the mounting channel and engage the slider to reciprocate the slider against the action of compression springs. The cabinet module is supported by mounting hooks that are received in openings in the mounting channel. The mounting channel also incorporates locking rod openings to receive locking rods mounted on the rear face of selected drawers in cabinet modules. The locking rods have an enlarged end which is received through the enlarged end of a keyhole-shaped opening in the slider. When the slider is moved to one extreme position, the narrowed end of the keyhole-shaped opening slides over the locking rod and thereby prevents the enlarged end of the locking rod from being withdrawn from the mounting channel. Selected drawers have a cam operator secured at the rear edge of the drawer. The camming surface of the operator presses against the slider to reciprocate the slider to the extreme of its travel where the locking rod's are captured by their enlarged ends. Unless all of the drawers with cam operators in place are open, the locking slider is not free to move under the bias of the compression springs to move the enlarged portion of the keyhole into registration with the enlarged ends of the locking rods. Therefore the cabinet in which such drawers are located cannot be opened or removed from the mounting channel. In this way, a lock on a selected drawer can prevent all of the drawers and modules on one side of the stand from being removed. Only when all of the drawers with a locking rod (typically only the top-most drawer has a lock and lock rod) are partially opened is it possible to remove the modules. This comes about because the locking rod openings in the mounting channel are not sufficiently larger than the locking rod. Therefore the cabinet module cannot be lifted a sufficient distance to cause the support hooks to clear the mounting openings in the channel unless the drawer is withdrawn a sufficient distance for the locking rod to completely clear the mounting channel. The drawer cannot be opened if the drawer is locked. In this manner, a single lock on a single drawer can prevent the opening of any other drawer on that side of the stand which has a locking rod and can prevent the removal of any of the cabinet modules on that side of the stand.

Although the a cabinet modules have been described in connection with modules that incorporate drawers, the modules may have virtually any other kind of front closure as well. One of the facilities of the invention is particularly apparent where the lower-most cabinet is provided with a closure which is attached by fasteners. The enclosed volume thereby formed by the cabinet sides, top, bottom, and the removable closure, provide an ideal electronics enclosure for an uninterruptable power supply (UPS). Water-resistant louvered vents may be provided to provide adequate cooling to the electronic components without exposing them to the risk of damage by spilled liquids. By locating the UPS module at the lower-most mounting position for modules, the UPS battery is located below the normal center of gravity of the stand, thereby further lowering the installed center of gravity, which makes it easy to push the stand without risk of upset. Sufficient battery power can be housed in a single module to power multiple medical instruments far longer than is conventionally provided by their on-board backup batteries. Although other voltages may be provided, it is particularly useful to provide AC line voltage (117 volts in the U.S.). This allows for providing a variety of instruments without special adoption simply by plugging them into the line output of the UPS. The line voltage output may desirably be routed out of the UPS module and inside the mounting channel in the space between the slider and interface plate. In this way, the AC output of the UPS can supply a multiple outlet electrical box at approximately the level of the push handle (waist level for the operator). This permits a single line cord to the UPS to supply multiple instruments with uninterruptable AC by plugging them into the multiple outlet electrical box, without requiring that the operator stoop to plug in multiple cords into multiple wall outlets. When desired, a module may provide DC power at predetermined voltages. Since different medical instruments have differing voltage requirements, the modularity of the system is of significant value in supporting many different electronic instruments from a single storage and transport platform.

There is therefore provided a new and improved portable stand mounting for modular cabinets that may be utilized to easily transport and store medical and other supplies and which may incorporate an uninterruptable power supply to expand the usable battery life of a variety of instruments. Since the cabinets are modular, the configuration of a stand may be customized to the particular requirements of the operator, including providing cabinets with open storage, drawers or closed modules housing electronic instruments such as the UPS. The invention makes it possible to extend the use of existing wheeled stands (such as IV stands) which reduces the capital cost and storage room space requirements of providing a portable cabinet.

BRIEF DESCRIPTION OF THE DRAWINGS

Although the invention has been described in conjunction with an exemplary embodiment the invention is not limited thereby nor by the illustrated embodiment shown in the accompanying figures in which like reference numerals refer to like parts throughout, and in which.

DETAILED DESCRIPTION OF THE DRAWINGS

Figure 1:
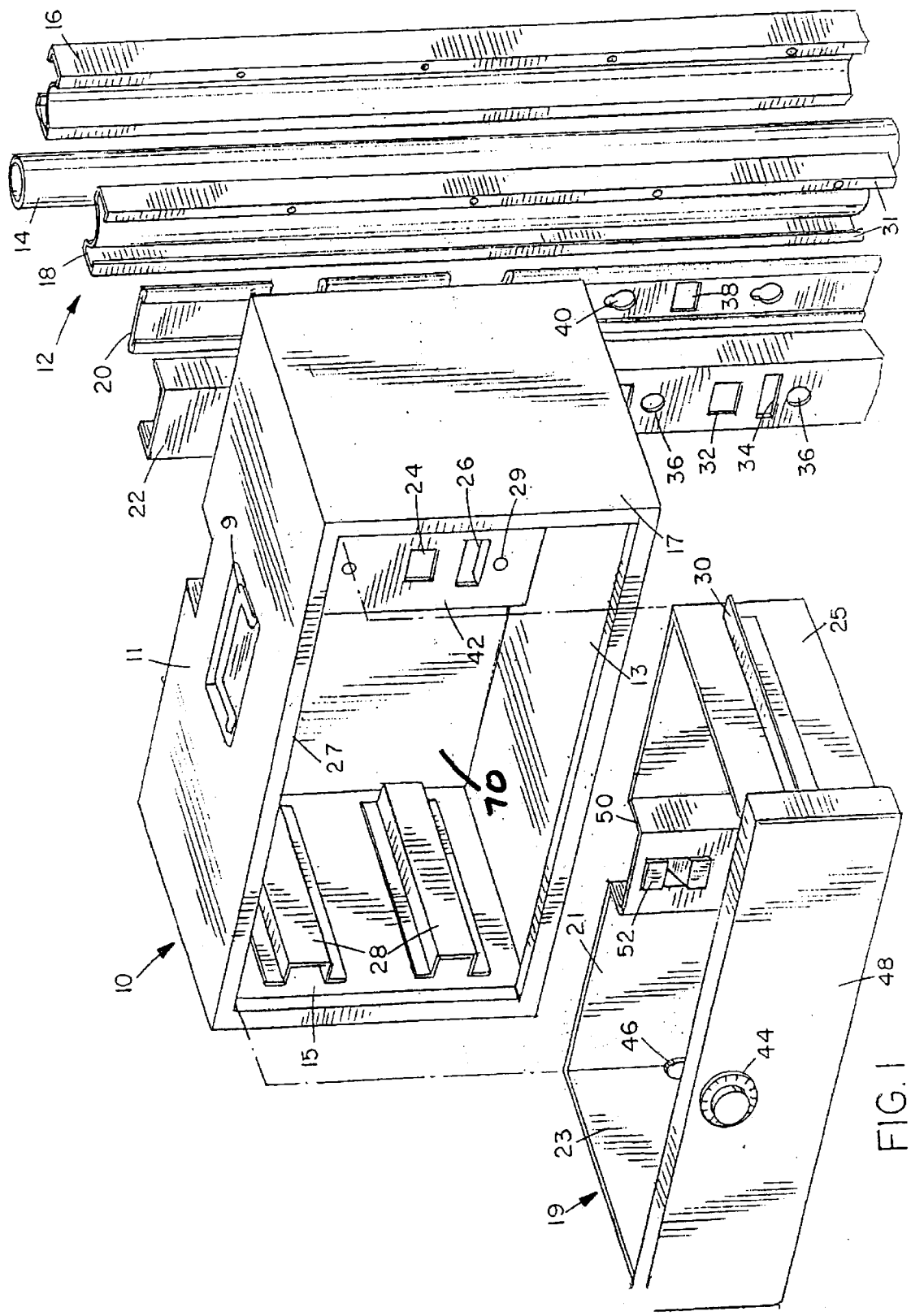
FIG. 1 is an exploded perspective view of a typical cabinet and its support pole structure.
Figure 2:
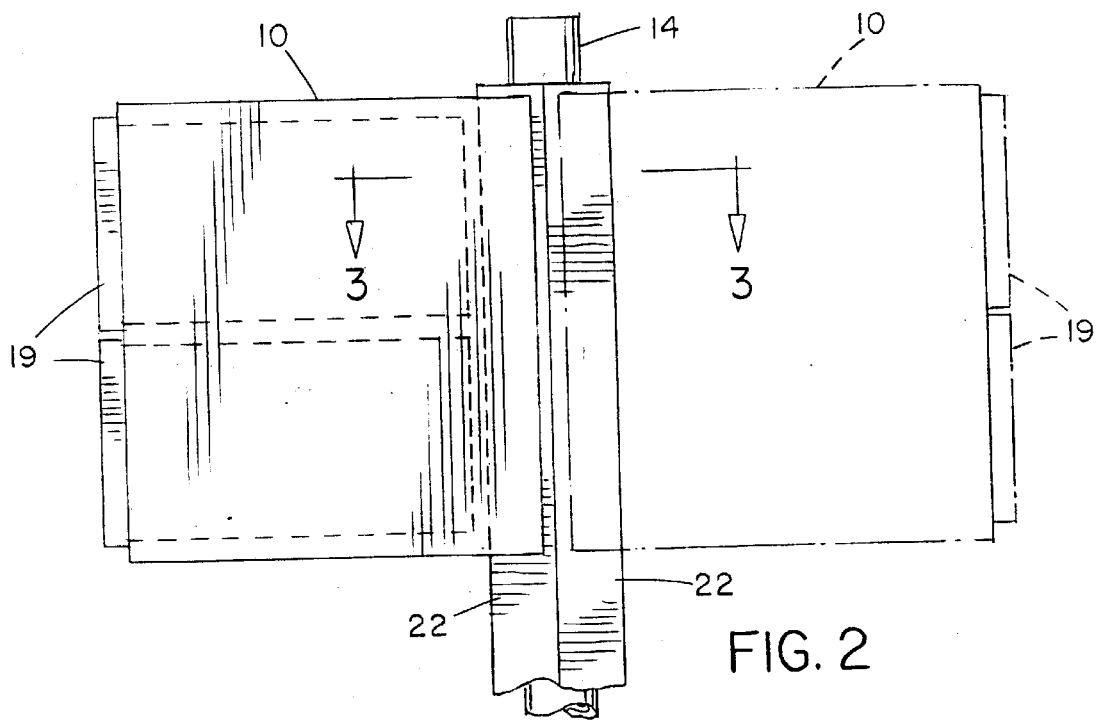
FIG. 2 is a side elevation view of the assembled unit.
Figure 3:
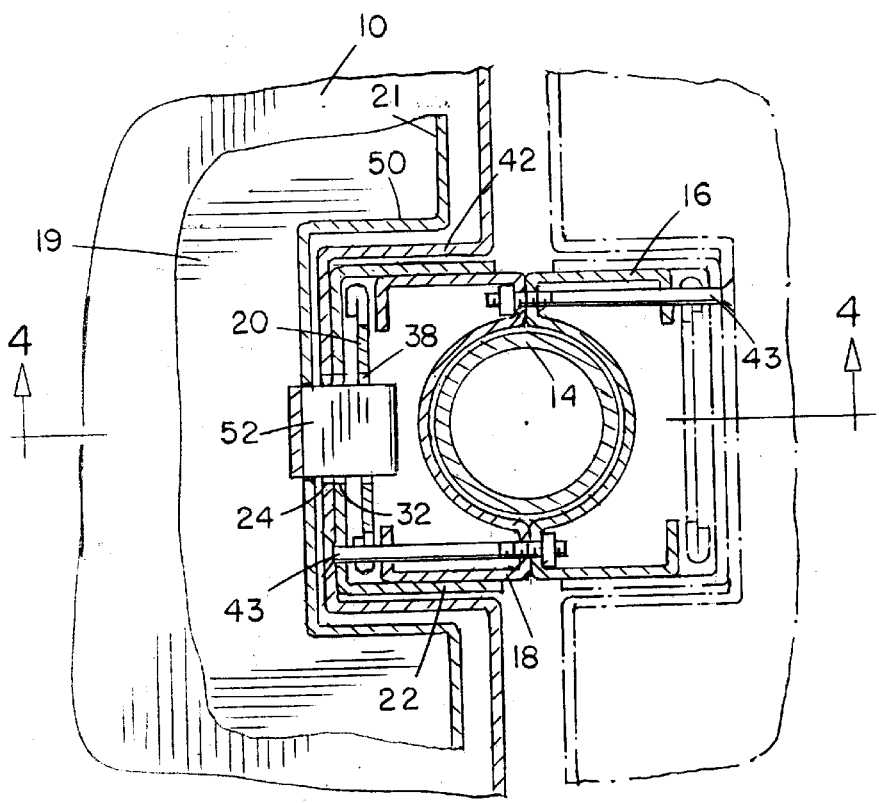
FIG. 3 is an enlarged sectional view taken on line 3—3 of the FIG. 2.

Referring now to FIGS. 1 through 3, there is illustrated an embodiment of the invention which shows the essential combination of the invention including a cabinet module 10, a mounting segment 13 comprised of a mounting channel 22, locking slider 20, and an interface plate 18 which are mated to a vertical support (in this embodiment, a pole 14 with a circular cross-section). In this case, the cabinet module is shown as having provision for drawer closures. Two drawers (a single drawer 19 is illustrated) completely close the opened end of the cabinet module 10 with the top 11, bottom 13 and left and right sides 15 and 17 and a face plate 70. A foldout handle 9 may be utilized to convert the module to a hand-carried tool kit. The drawer 19 is shown to incorporate a rear panel 21, sides 23 and 25 and front face 48. The rear panel 21 of the drawer incorporates a channel recess 50 which mates with mating channel 42 in the cabinet module and in turn with the various openings of the mounting channel 22. Each drawer 19 has a pair of drawer support slides 30 which cooperate with the cabinet channels 28. Conventional drawer roller slides (not shown) may be incorporated so that the drawers roll smoothly as they are withdrawn from and pushed back into the cabinet. Drawer 19 is shown as being provided with a combination lock 44 which controls the position of a lock tang 46. The tang 46 cooperates with the face flange 27 on the cabinet 10 to prevent the drawer 19 from being withdrawn when the locking tang is in the position illustrated. The channel recess 50 optionally incorporates a slider operator 52 and locking pin 56 which will be better understood from the discussion of FIG. 4.

The basic functioning of the invention is that the mounting channel 22 and locking slider 20 provide openings which selectively engage the mounting hooks, module locking and drawer locking features. As will be discussed more fully hereinafter, when a drawer 19 is fully inserted, the slider operator 52 protrudes through the slider operator opening 24 in mating channel 42. At the same time the locking rod 56 (see FIG. 5) on a drawer so equipped extends through the locking rod opening 29 and the channel rod opening 36 into the keyhole opening 40 in the locking slider 20. The slider operator 52 cooperates with the lower edge of the operator follower opening 38 in the locking slider 20 to reciprocate the slider downwardly and thereby force the narrow end of the keyhole opening 40 into engagement with the locking rod 56 to prevent the withdrawal of that drawer until the lock 44 is operated to allow the controlling drawer to be withdrawn slightly. The action of withdrawing the drawer allows springs (to be discussed in conjunction with FIG. 4) to return the locking slider to the position where the enlarged opening is in registration with the locking rods and therefore a drawer with a locking rod 56 can be withdrawn from its fully closed position.

FIG. 1 also illustrates the relationship between the paired interface plates 16 and 18. When mated, the two interface plates surround the support pole 14 and conform to its shape (circular in the example). In other installations, interface plates may have engagement surfaces that are part rectangular, oval, or square in cross-section to mate to differently shaped support poles. The interface plates 16 and 18 incorporate slider engagement flanges 31 which guide the locking slider 20 as it reciprocates.

In FIG. 2, two interface plates are assembled to the pole 14 with only the mounting channels 22 being visible after assembly. Two cabinet modules 10 are mounted on opposite sides of the support pole 14 with each incorporating two drawers 19.

In FIG. 3, the relationship is illustrated between the mounting channel 22, a mating recess 42 in a cabinet module, and the channel recess 50 in drawer 19. The drawer illustrated incorporates a slider operator 52 which protrudes through the slider operator opening 24 in the cabinet module 10 and a channel operator opening 32 in the mounting channel 22. This allows the slider operator 52 to contact the camming surface (of the lower edge of opening 38) of the slider 20. Also illustrated are the fastener sets 43 which secure the interface plates 16 and 18 together into a pole gripping configuration. It will be understood that where cabinet modules are to be provided on both sides of the vertical support, that mounting channels and'sliders would be provided on the mounting channel 16 as well.

Figure 4:
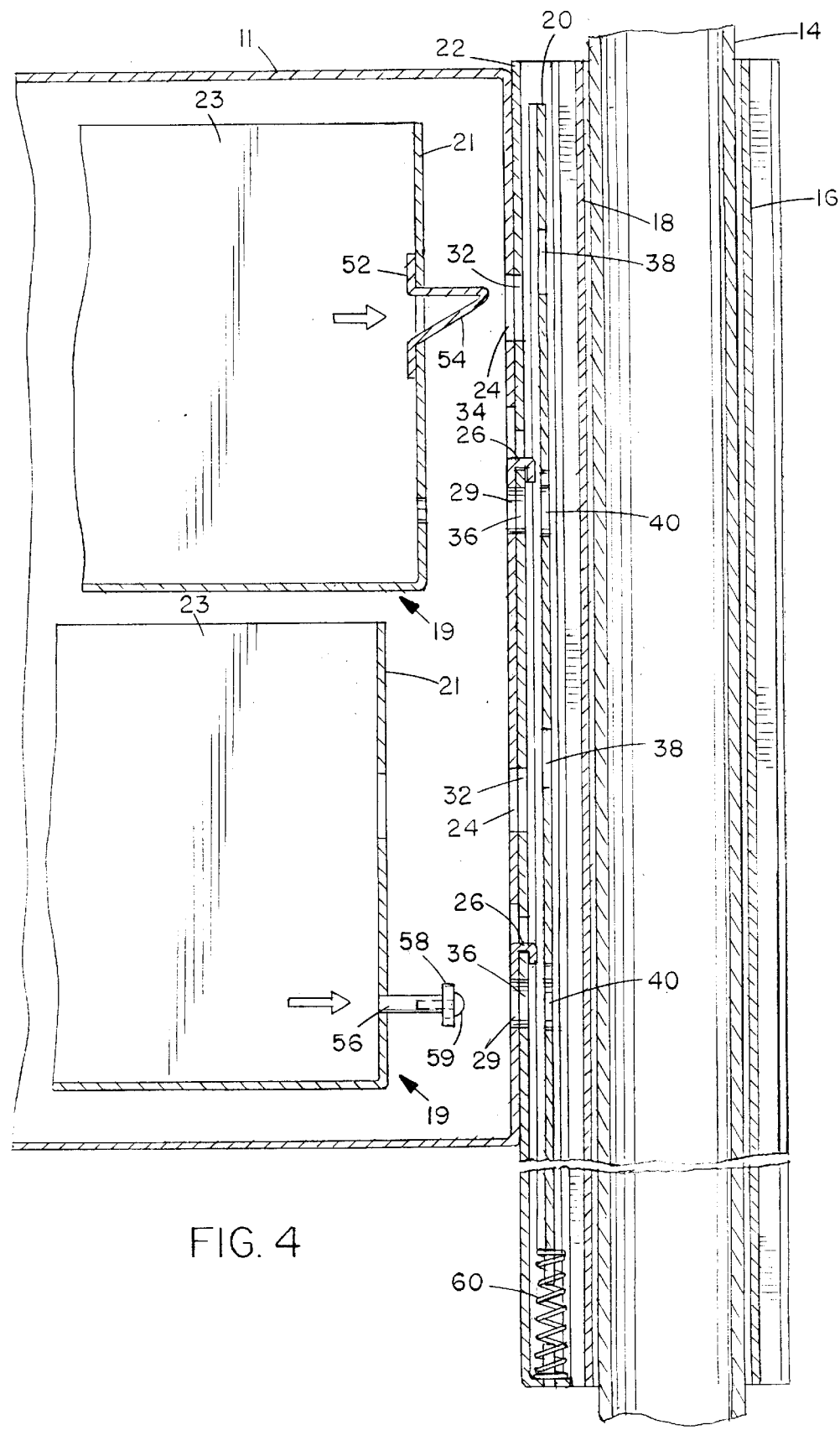
FIG. 4 is a sectional view taken on line 4—4 of FIG. 3, showing the drawers open.

Referring now to FIG. 4, the manner in which the cabinet modules 10 cooperate with drawers 19 is illustrated. The uppermost drawer 19 is provided with a combination or key lock (see FIG. 1). The rear face 21 of the upper drawer 19 mounts a slider operator 52. The slider operator 52 has a sloping cam surface 54. With drawer 19 fully inserted, the cam surface 54 protrudes through the slider opening 24 and the mounting channel operator opening 32 so that it can engage the lower edge of the operator follower opening 38 on slider 20. Upon full insertion the upper drawer 19 forces the slider vertically downwardly against the action of compression springs 60.

Lower drawer 19 is fitted with a locking rod 56 which has an enlarged end which may suitably be created by attaching a lock engagement washer 58 with a washer retention bolt 59. The washer 58 is sized to fit through the locking rod opening 29 in the mating channel and the channel rod opening 36 in the mounting channel. The washer will also fit through the enlarged end opening of the keyhole opening 40 in the slider 20. However when the upper drawer 19 is fully inserted it reciprocates the slider downwardly so the narrow end of the keyhole opening 40 fits tightly around the locking rod 56 and prevents the enlarged end formed by the lock engagement washer 58 from fitting through the opening, thereby capturing the drawer.

In the illustrated configuration the slider has six keyhole openings so that if two drawer cabinet modules are utilized, and three modules stacked on a side of the support pole, then a single lock is capable of locking a total of six drawers. It should also be noted that whenever any drawer in a cabinet module is captured by the locking slider it is also not possible to remove the module from the mounting channel. This is prevented because the module mount hooks 26 cannot be lifted clear of the module mount openings 34 because the vertical movement is prevented by the engagement of the locking rod 56 with the locking slider and by the limitation of substantial vertical movement of the locking rods 56 in the channel rod opening 36.

Figure 5:
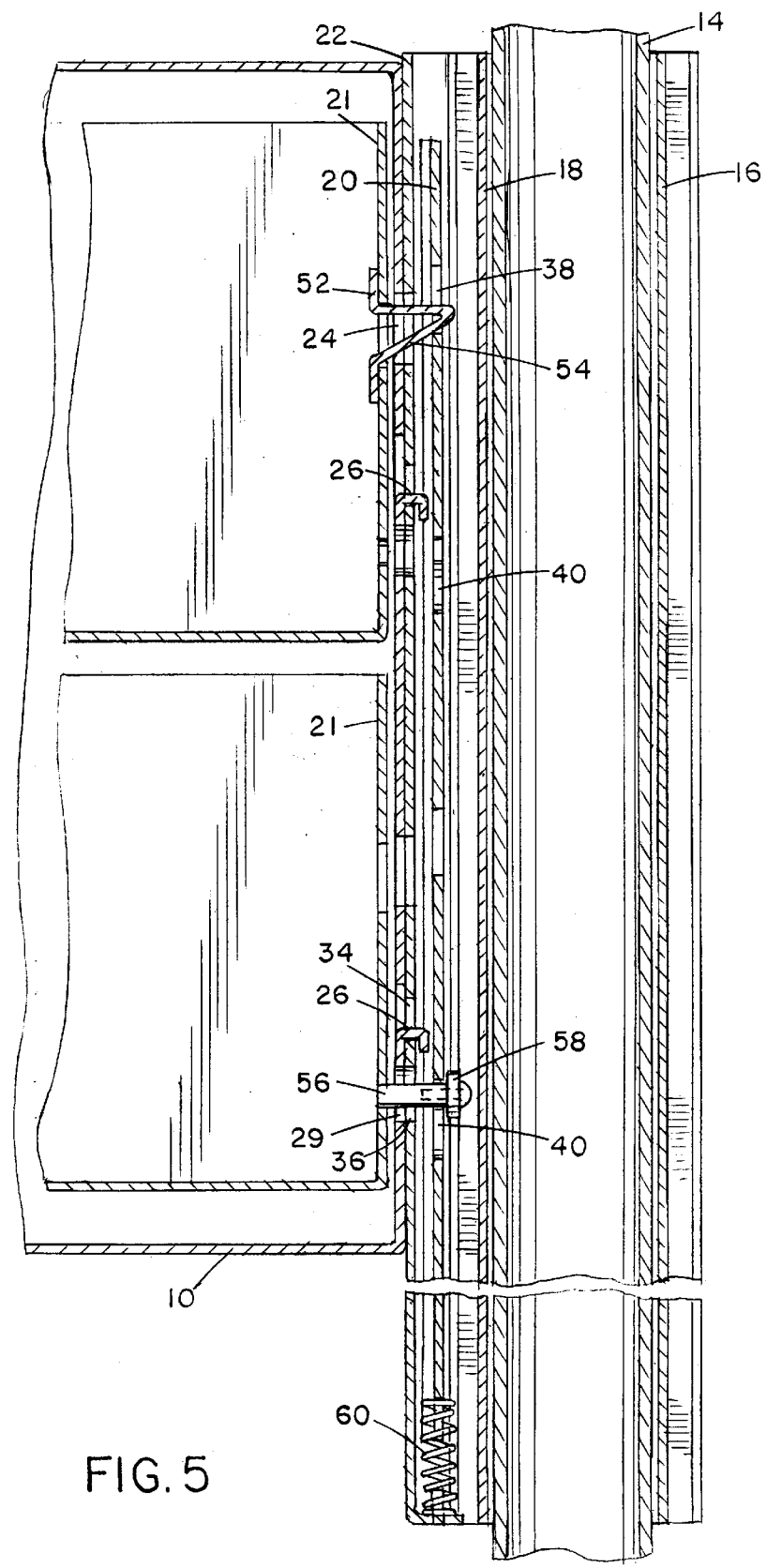
FIG. 5 is a view similar to FIG. 4, with the drawers closed and locked.

Referring now to FIG. 5, the locking engagement caused by a full of insertion of drawers with cam operators 52 and locking rods 56 is illustrated. The engagement of the locking operator cam surface 54 has driven the slider 20 vertically so that the keyhole opening 40 in registration with the locking rod 56 has been driven to where the narrowed end of the keyhole opening has captured the enlarged end (washer 58) of the locking rod 56 to prevent the withdrawal of the lower drawer 19 so long as the upper drawer 19 is locked in the closed position. At the same time the position of the slider 20 and the relatively limited freedom of movement within the channel rod opening 36 prevents removal of the module 10 by preventing the vertical lifting of the module 10 such that the hooks 26 cannot be lifted clear of the module mount openings 34.

Figure 6:
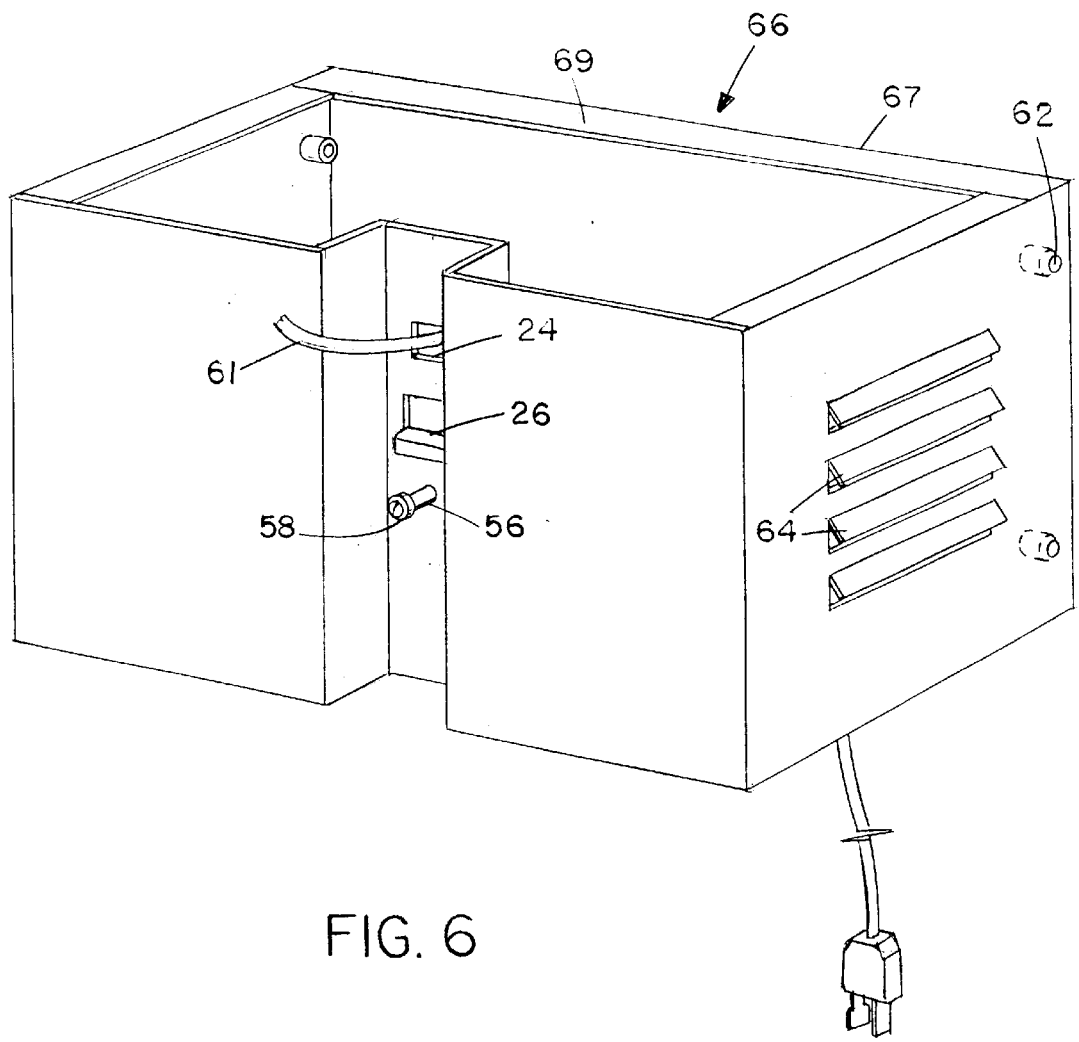
FIG. 6 is a perspective view of a cabinet specifically adapted to house an uninterruptable power supply.

Referring now to FIG. 6, another type of cabinet module is illustrated. In the specific example illustrated, the cabinet is an electronic enclosure especially adapted for incorporating an uninterruptable power supply (UPS) with its associated electronics and battery components. However, it will be understood the other module types including open bays, full height drawers, and specific closures can be provided within the scope of the invention.

In the illustrated configuration, the UPS cabinet module 66 is closed by a fastener attached faceplate 67. The flanges 69 on the cabinet face 67 mount threaded receptacles 62 for receiving bolts from the exterior of the cabinet. This allows service access to the UPS without the necessity of removing the cabinet module from a stand. The rear of the cabinet module 66 incorporates mounting hooks 26 and a locking pin 56 as in other cabinet modules. However instead of a cam operator, a power conduit 61 exits the cam operator opening 24. This conduit 60 may be fed through the channel operator opening 32 in the mounting channel 22, and the operator follower opening 38 in the slider 20 to permit the cable to be received in the recess formed by the interface plate (see FIG. 3). In this way, power may be delivered from the cabinet module 66 located at the lowermost portion of the stand to a convenient height on the stand where a multiple output outlet box can be mounted and various electronic equipment plugged in. This allows a single electrical cord from the cabinet 66 to power multiple instruments on the stand and to provide uninterruptable power while the stand is being transported or during an interruption in line current. The louvers 64 provide passive ventilation to the interior of the cabinet. The sloping upper surfaces of the louvers deflect water or other liquids that might be spilled on the cabinet to prevent the entry of the liquid into the interior of the cabinet where it might damage sensitive electronic components. The ability to locate the cabinet module 66 at the lowermost portion on the stand makes it possible to locate the UPS at the lowest part of the stand. The UPS will typically be the heaviest electronic component carried on the stand, particularly because of the battery capacity provided. By locating the UPS module below the ordinary center of gravity of the stand, the UPS further lowers the as installed center of gravity. The lowered center of gravity makes it easier to push the stand without a tendency for the stand to upset. This ability to position components optimally and flexibly is one out of the direct benefits of the flexible mounting and lock operators provided by the invention. The mounting system of the invention has special advantages when used with critical electronic instruments and systems such as a UPS. The nature of the connectors utilized insures that the UPS will be mounted upright and that the louvers will function as intended because the module cannot be installed inverted.

Having described our invention, we now claim:

1. A cabinet mount for mounting at least one cabinet module onto a vertical support comprising:

a single vertical support;

an elongated channel having an engagement surface and at least one mounting surface;

a cabinet module having spaced sides;

wherein said elongated channel is intermediate to said spaced sides;

at least one face plate having a width substantially corresponding in size to the distance between said spaced sides of the cabinet module;

said at least one face plate connected to said sides;

said elongated channel supported by said vertical support;

said cabinet module and said mounting channel having cooperating hooks and openings to allow said cabinet module to be supported from said mounting channel.

* * * * *